A. H. PAGE.
Clothes-Wringers.

No. 5,224. Reissued Jan. 7, 1873.

WITNESSES.

INVENTOR.

Alby H. Page.
by his attorney F. L. Stetson.

A.M. PHOTO-LITHOGRAPHIC CO. N.Y. (OSBORNE'S PROCESS.)

UNITED STATES PATENT OFFICE.

ALBY H. PAGE, OF MANCHESTER, NEW HAMPSHIRE, ASSIGNOR, BY MESNE ASSIGNMENTS, TO THE METROPOLITAN WASHING-MACHINE COMPANY.

IMPROVEMENT IN CLOTHES-WRINGERS.

Specification forming part of Letters Patent No. 61,680, dated January 29, 1867; reissue No. 5,224, dated January 7, 1873.

DIVISION B.

*To all whom it may concern:*

Be it known that I, ALBY H. PAGE, of Manchester, Hillsborough county, New Hampshire, formerly of South Boston, in the county of Suffolk and State of Massachusetts, have invented a new and useful Improvement in Clothes-Wringers; and I do hereby declare that the following is a full, clear, and exact description thereof, reference being had to the accompanying drawing and to the letters of reference thereon, in which—

Figure 2:
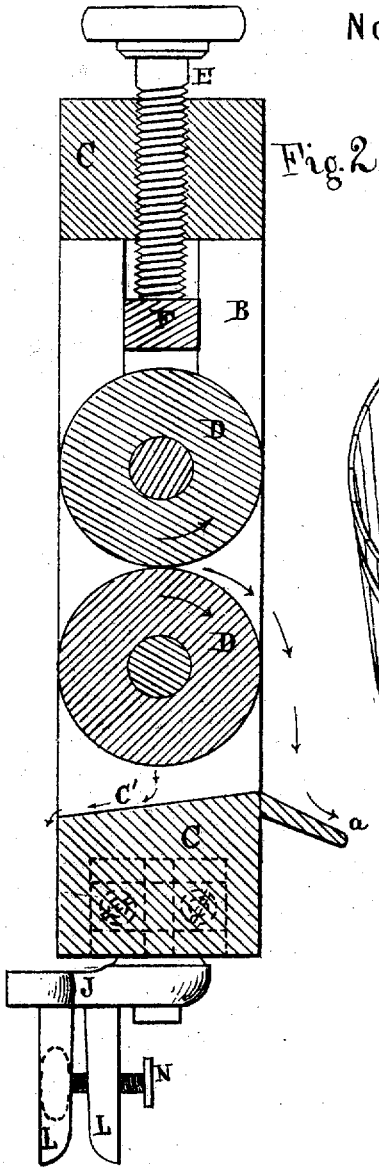
Figure 1:
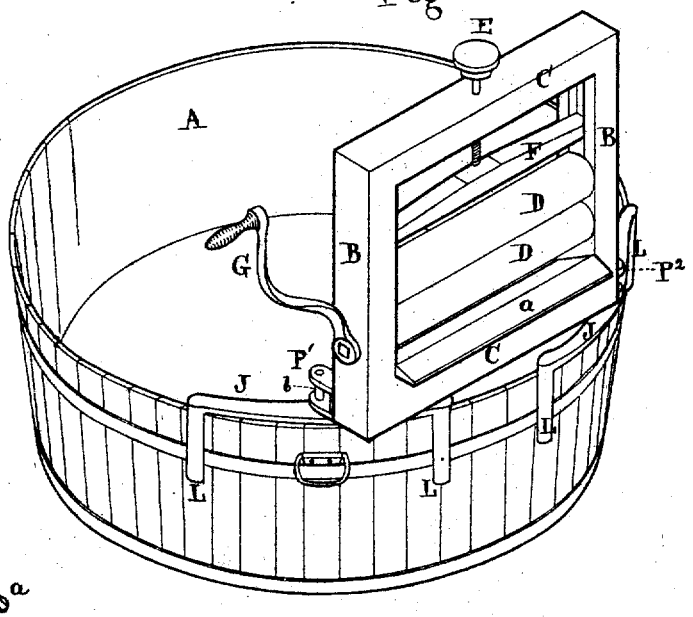
Figure 3:
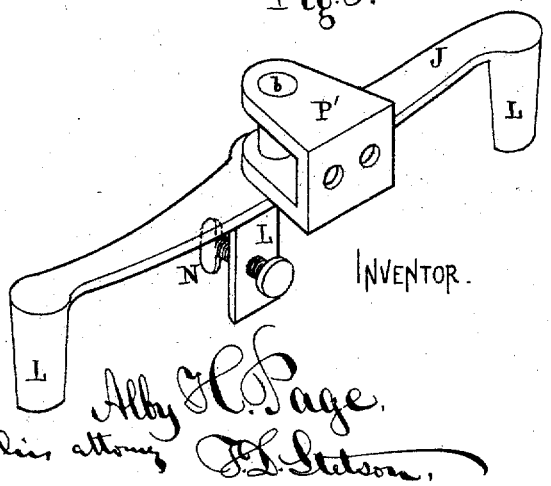

Figure 1 represents a perspective view of a wash-tub with my improved wringer clamped thereto. Fig. 2 is a vertical transverse section taken through the wringer, and showing the operation of the same. Fig. 3 is a perspective view of the clamp removed from the wringing-frame.

Similar letters of reference indicate like parts in all the figures.

The invention applies to machines for the wringing, washing, and starching of clothes by passing them between parallel rollers covered with India rubber or other elastic material, and so arranged and adjusted that the clothes can be passed between them with a proper degree of pressure to expel the water or other liquid. It relates to provisions for inducing a yielding and adjustable pressure on the rolls, the rolls and their spring or bridge being allowed to tilt or approach each other nearer at one end than at the other while urged together with a force which is conveniently adjusted at a single point.

A represents an ordinary wash-tub. B B and C C represent a frame, of wood or other suitable material, for holding the rolls, with the inclined surface C′ to carry the water into the tub. A projecting shelf, *a*, inclined in the opposite direction, serves as a clothes-guide to conduct the wrung clothes over the sides of the tub. D D are two rollers which are parallel to each other and have their bearings in the frame pieces or standards B B. These rollers are covered with white or light-colored India rubber. The upper roller B is capable of adjustment by means of a thumb-screw, E, which presses upon a bridge or spring, F, which presses upon the bearing-blocks of the upper roller.

The advantages of this manner of adjusting the pressure by means of a single screw and bridge from one bearing to the other are obvious, as it allows the roll to balance on the point of pressure and either end to rise or open most according to the thickness of clothes passing through, and only one screw has to be turned to adjust the roll.

The roller D is rotated by crank G on the outside of the frame.

J J represent two curved bars with fingers L L L, set-screw N, brackets $P^1$ $P^2$ with studs *b*, which constitute my devices for clamping the wringer to a tub. This construction presents a swivel or joint which allows each clamping device to turn, and thus adapt itself perfectly to tubs and washing-machines of different sizes and forms. The bracket $P^1$ is on the inner face of the framing, while the bracket $P^2$ is on the edge. This arrangement holds the operating-crank G outboard of the tub so as to allow it more room to turn, while the main body of the wringer is held sufficiently within the tub to allow the water to be all led inward.

Having thus fully described my invention, I will refer more particularly to what I claim as new and useful.

I do not claim the application of an elastic gum to the rolls of the wringing-machine, nor do I claim the application of screws for adjusting the pressure; but—

What I claim in this patent, as an improvement in clothes-wringers, is—

The tilting bridge F and adjusting means E, in combination with the elastic rolls and also with a portable frame and clamping means for attaching to a tub, as specified.

In testimony whereof I have hereunto set my name in presence of two subscribing witnesses.

ALBY H. PAGE.

Witnesses:

THOMAS D. STETSON,
ALF. WESTBROOK.